(12) United States Patent
Bertossi

(10) Patent No.: US 7,322,601 B2
(45) Date of Patent: Jan. 29, 2008

(54) RESILIENTLY COMPRESSIBLE DEPLOYMENT RAMP FOR INFLATABLE CURTAIN

(75) Inventor: Rico Scott Bertossi, Richmond, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 227 days.

(21) Appl. No.: 11/008,862

(22) Filed: Dec. 10, 2004

(65) Prior Publication Data

US 2006/0125214 A1    Jun. 15, 2006

(51) Int. Cl.
*B60R 21/213* (2006.01)
(52) U.S. Cl. .................... 280/730.2; 280/751
(58) Field of Classification Search ............. 280/730.2, 280/751
See application file for complete search history.

(56) References Cited

U.S. PATENT DOCUMENTS

| | | | | |
|---|---|---|---|---|
| 3,744,338 A | * | 7/1973 | Komatsu et al. | 74/492 |
| 3,894,750 A | * | 7/1975 | Eckels | 280/730.1 |
| 4,105,220 A | * | 8/1978 | Pacific | 280/304.4 |
| 5,098,124 A | * | 3/1992 | Breed et al. | 280/751 |
| 5,791,683 A | | 8/1998 | Shibata et al. | |
| 5,933,874 A | * | 8/1999 | Randolph | 2/463 |
| 6,079,732 A | | 6/2000 | Nakajima et al. | |
| 6,170,861 B1 | | 1/2001 | Tietze | |
| 6,217,061 B1 | | 4/2001 | Harland et al. | |
| 6,231,071 B1 | * | 5/2001 | Keane | 280/730.2 |
| 6,254,123 B1 | | 7/2001 | Urushi et al. | |
| 6,257,616 B1 | | 7/2001 | Nowak et al. | |
| 6,361,069 B1 | | 3/2002 | Saito et al. | |
| 6,530,594 B1 | | 3/2003 | Nakajima et al. | |
| 6,616,175 B2 | | 9/2003 | Hofmann et al. | |
| 7,011,337 B2 | * | 3/2006 | Aoki et al. | 280/730.2 |
| 7,059,629 B2 | * | 6/2006 | Takahara | 280/730.2 |
| 7,121,579 B2 | * | 10/2006 | Ochiai et al. | 280/730.2 |
| 7,134,682 B2 | * | 11/2006 | Totsuka et al. | 280/728.2 |
| 2003/0146606 A1 | | 8/2003 | Hanjono | |
| 2003/0178824 A1 | | 9/2003 | Ogata | |
| 2007/0090634 A1 | * | 4/2007 | Jang et al. | 280/730.2 |

* cited by examiner

*Primary Examiner*—Paul N. Dickson
*Assistant Examiner*—Joselynn Y. Sliteris
(74) *Attorney, Agent, or Firm*—Tarolli, Sundheim, Covell & Tummino LLP

(57) ABSTRACT

An apparatus (10) helps to protect an occupant of a vehicle (12) that has a roof (18), a side structure (16), and a trim piece (310) overlying the side structure. The apparatus (10) includes an inflatable curtain (14) inflatable away from the vehicle roof (18) to a position adjacent the side structure (16). The apparatus (10) also includes a deployment ramp (160) having a deployment position in which the deployment ramp directs the inflatable curtain (14) to deploy inboard of the trim piece (310). The deployment ramp (160) is configured and arranged to deflect away from the deployment position in order to absorb forces from occupant impacts with the deployment ramp. Preferably, the deployment ramp (160) is also configured and arranged to return to the deployment position after absorbing forces from occupant impacts with the deployment ramp when the inflatable curtain (14) is not inflated.

11 Claims, 7 Drawing Sheets

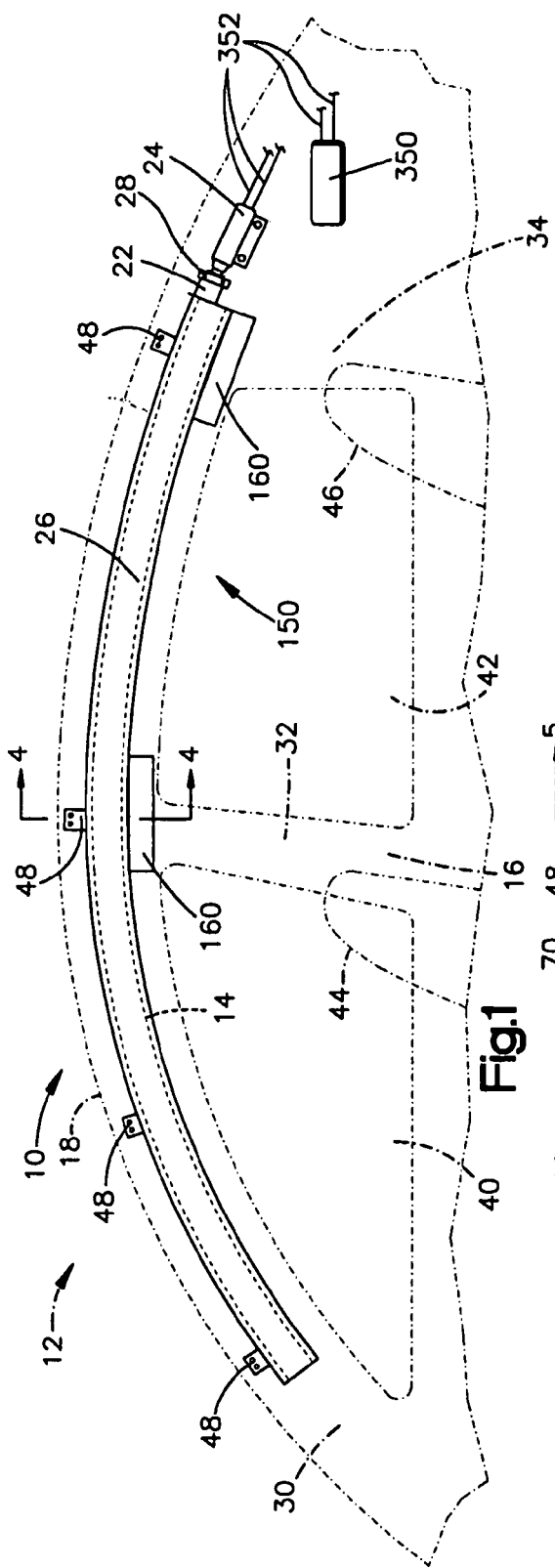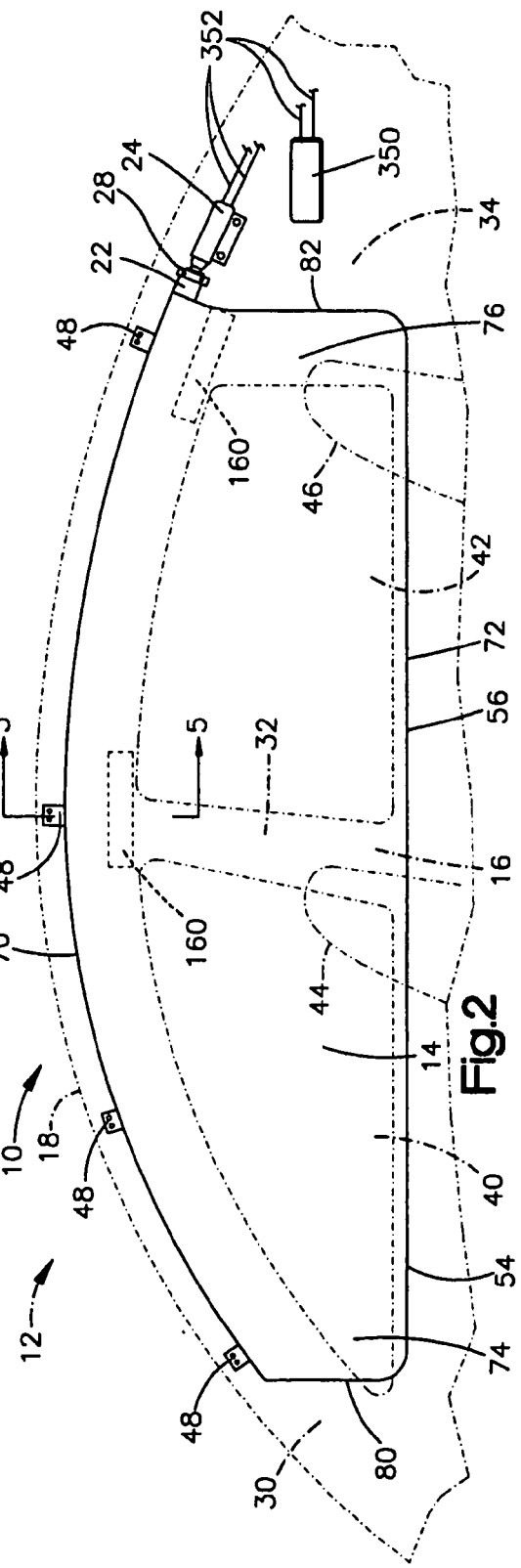

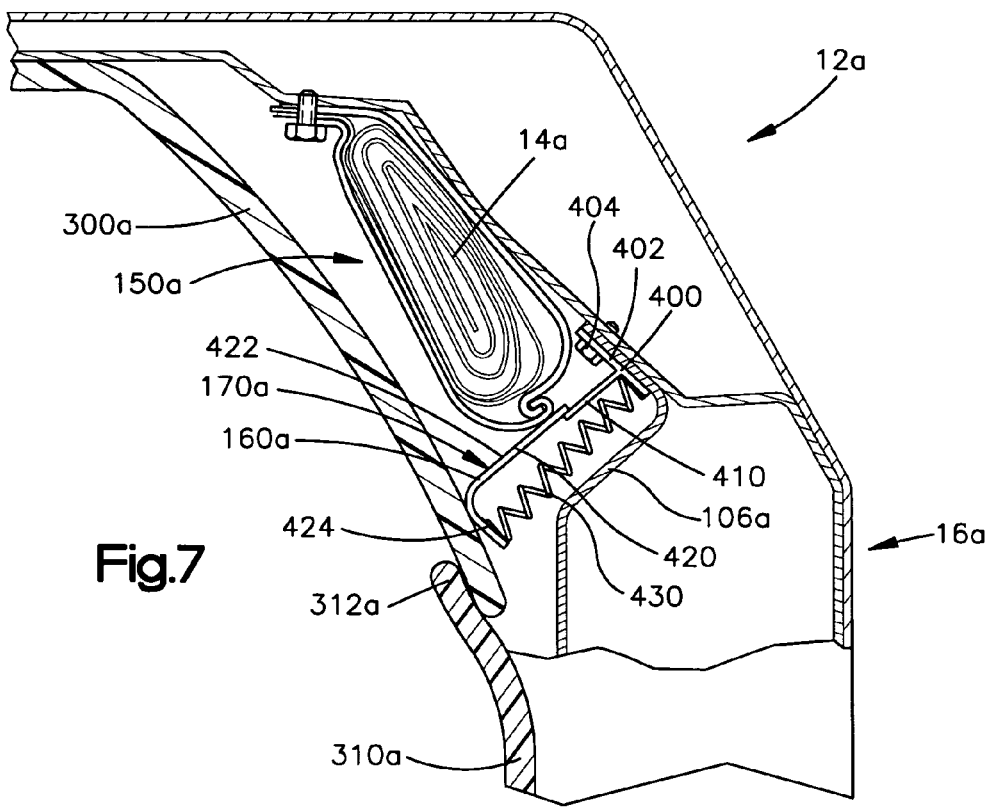
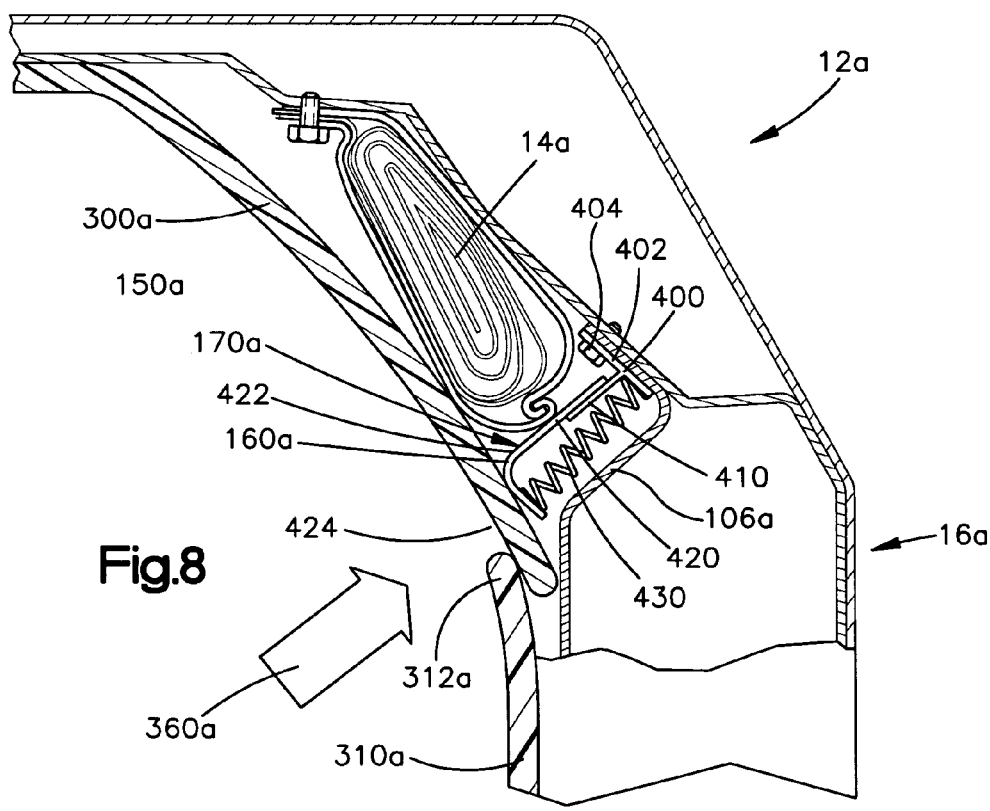

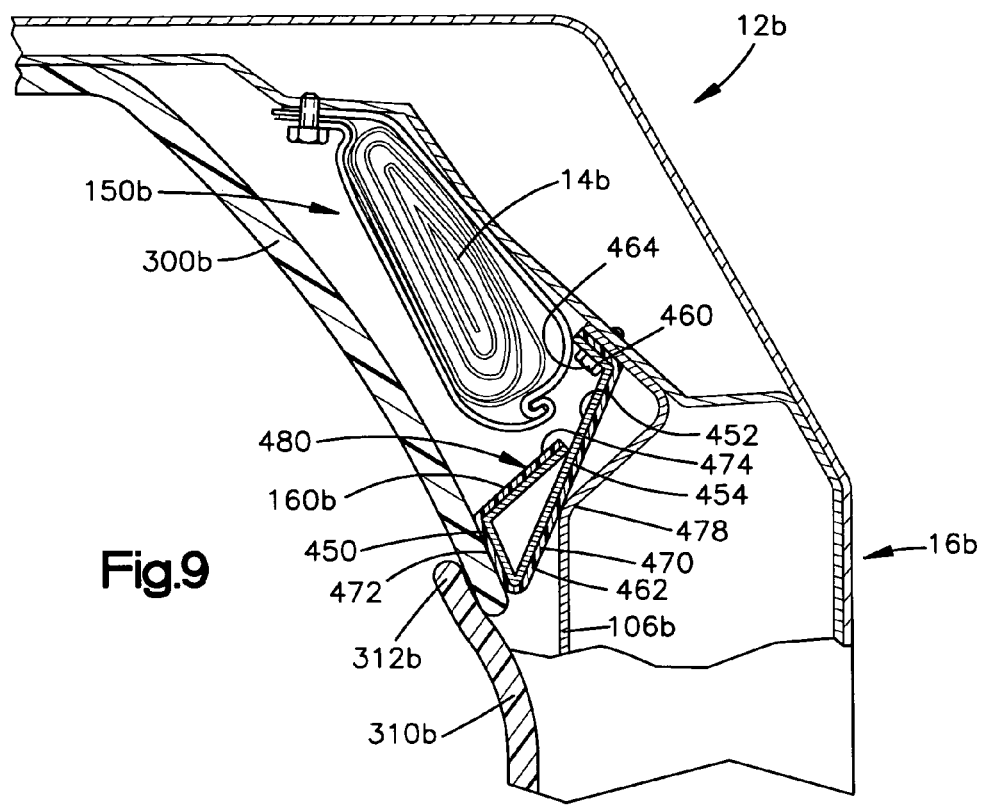
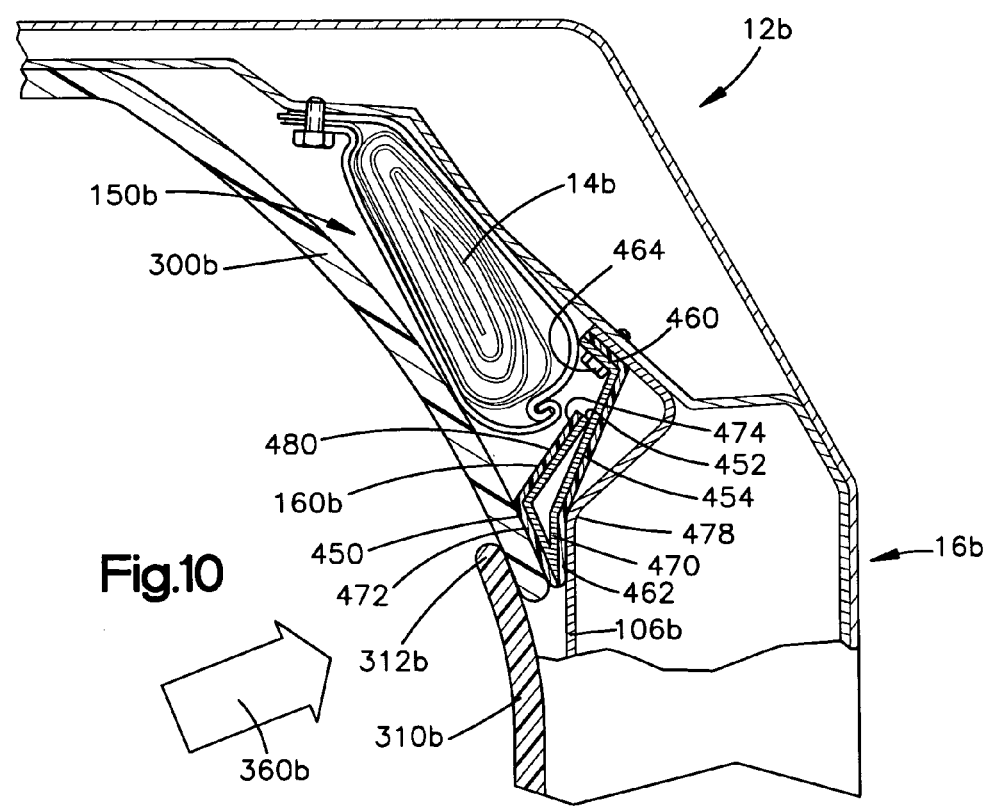

RESILIENTLY COMPRESSIBLE DEPLOYMENT RAMP FOR INFLATABLE CURTAIN

FIELD OF THE INVENTION

The present invention relates to an inflatable apparatus for helping to protect a vehicle occupant in the event of a side impact to the vehicle and/or a vehicle rollover.

BACKGROUND OF THE INVENTION

It is known to inflate an inflatable vehicle occupant protection device to help protect a vehicle occupant. One particular type of inflatable vehicle occupant protection device is an inflatable curtain. The inflatable curtain is inflatable away from the roof of the vehicle between a vehicle occupant and the side structure of the vehicle in response to a side impact to the vehicle and/or a vehicle rollover. A known inflatable curtain is inflated from a deflated condition with inflation fluid directed from an inflator to the inflatable curtain.

SUMMARY OF THE INVENTION

The present invention relates to an apparatus that helps protect an occupant of a vehicle that has a roof, a side structure, and a trim piece overlying the side structure. The apparatus includes an inflatable curtain inflatable away from the vehicle roof to a position adjacent the side structure. The apparatus also includes a deployment ramp having a deployment position in which the deployment ramp directs the inflatable curtain to deploy inboard of the trim piece. The deployment ramp is configured and arranged to deflect away from the deployment position in order to absorb forces from occupant impacts with the deployment ramp when the inflatable curtain is not inflated. The deployment ramp is also configured and arranged to return to the deployment position after absorbing forces from occupant impacts with the deployment ramp when the inflatable curtain is not inflated.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an apparatus for helping to protect a vehicle occupant illustrating the apparatus in a deflated and stored condition in a vehicle, according to a first embodiment of the present invention;

FIG. 2 is a schematic view of the apparatus of FIG. 1 in an inflated condition in the vehicle;

FIG. 7 is a sectional view of a portion of an apparatus for helping to protect a vehicle occupant in a deflated and stored condition in a vehicle, according to a second embodiment of the present invention;

FIG. 8 is an enlarged view of a portion of the apparatus of FIG. 7 in a compressed condition;

FIG. 9 is a sectional view of a portion of an apparatus for helping to protect a vehicle occupant in a deflated and stored condition in a vehicle, according to a third embodiment of the present invention; and FIG. 10 is an enlarged view of a portion of the apparatus of FIG. 9 in a compressed condition.

DESCRIPTION OF EMBODIMENTS

Figure 3:
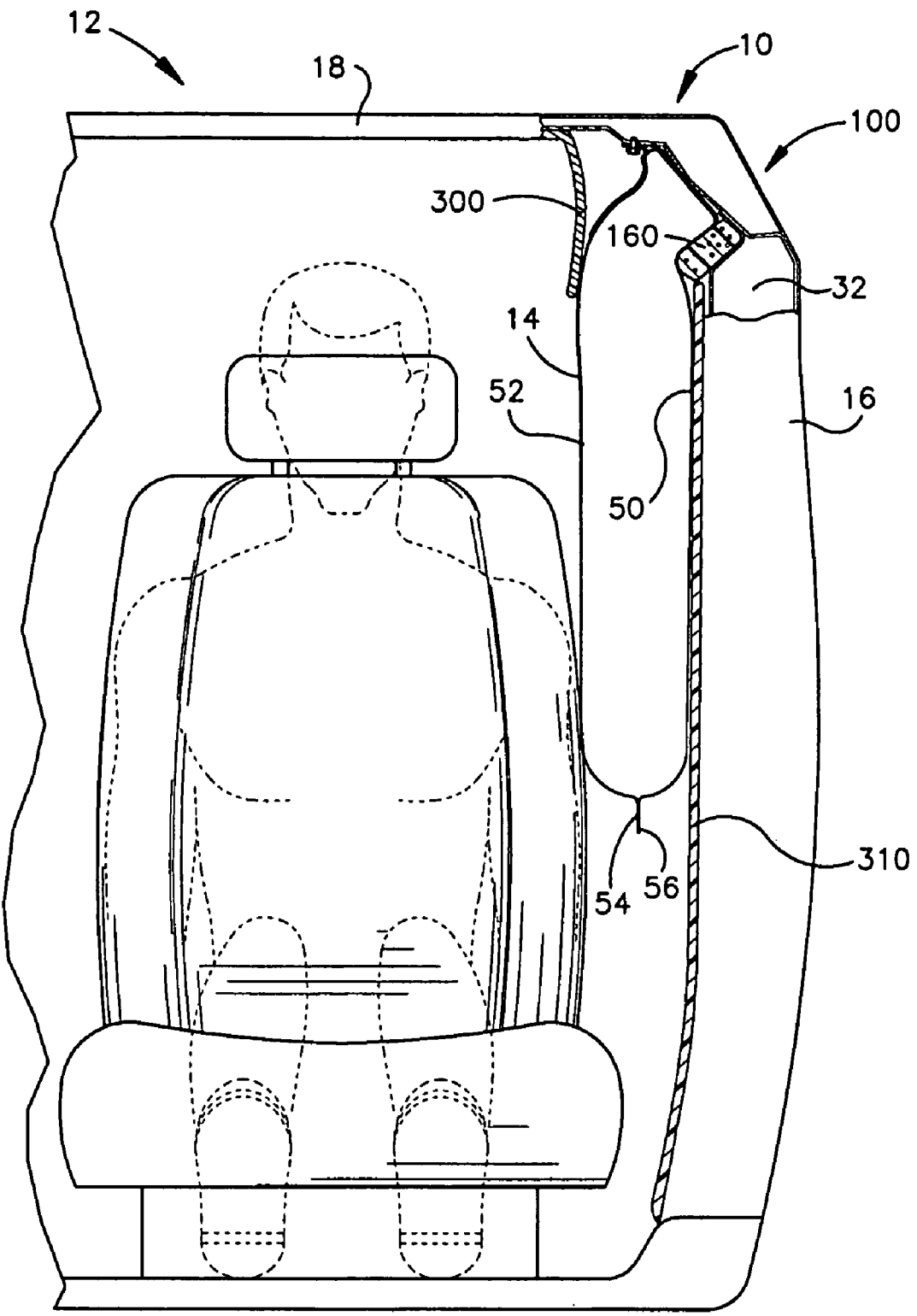
FIG. 3 is a sectional view of the apparatus of FIG. 2.

Representative of the present invention, an apparatus 10 helps to protect an occupant of a vehicle 12. As shown in FIGS. 1 and 2, the apparatus 10 includes an inflatable vehicle occupant protection device in the form of an inflatable curtain 14 that is mounted adjacent the side structure 16 of the vehicle 12 and the roof 18 of the vehicle. The side structure 16 of the vehicle 12 includes an A pillar 30, a B pillar 32, a C pillar 34, and front and rear side windows 40 and 42. The vehicle 12 also includes front vehicle seating 44 positioned adjacent the front side window 40 and rear vehicle seating 46 positioned adjacent the rear side window 42.

An inflator 24 is connected in fluid communication with the inflatable curtain 14. In the illustrated embodiment, the inflatable curtain 14 includes a neck portion 22 that is secured to the inflator 24 by means 28, such as a clamp. Alternatively, the neck portion 22 could be connected to the inflator 24 via a manifold (not shown). As another alternative, the apparatus 10 could include means (not shown), such as a fill tube, that has a portion located in the inflatable curtain 14 for distributing inflation fluid in the inflatable curtain 14.

The inflator 24 contains a stored quantity of pressurized inflation fluid (not shown) in the form of a gas for inflating the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 24 could be of any suitable type or construction for supplying a medium for inflating the inflatable curtain 14.

The apparatus 10 may include a cover 26 (FIG. 1), such as a fabric sheath or plastic housing, that helps support the inflatable curtain 14 in a stored and deflated condition. The deflated inflatable curtain 14 and the cover 26 have an elongated configuration and extend along the vehicle roof 18 and along the side structure 16 of the vehicle 12 above the side windows 40 and 42. The inflatable curtain 14 and cover 26 may include overlying tab portions 48 through which means, such as a fastener, may extend to connect the curtain and cover to the vehicle 12.

The inflatable curtain 14 (FIG. 3) includes panels 50 and 52 of material that are arranged in an overlying manner. Overlapping portions of the panels 50 and 52 are interconnected along at least a portion of a perimeter 54 of the inflatable curtain 14 to form a perimeter connection 56 of the curtain. The perimeter connection 56 helps define an inflatable volume of the inflatable curtain 14. The inflatable curtain 14 may also include interior connections (not shown) in which the overlying panels 50 and 52 are interconnected within the perimeter 54 to form non-inflatable portions that help define inflatable chambers of the curtain.

The inflatable curtain 14 may be formed in a variety of manners, such as by weaving the overlying panels 50 and 52 as a single piece of material, stitching the panels together, or interconnecting the panels via ultrasonic welding, heat bonding, or adhesives. In a one piece woven construction, the overlying panels 50 and 52 may be woven simultaneously from a material, such as nylon yarn, and may be coated with a gas impermeable material, such as urethane, or laminated with a gas impermeable film. The inflatable curtain 14 thus may have a substantially gas-tight construction. Those skilled in the art will appreciate that alternative materials, such as polyester yarn, and alternatives coatings, such as silicone, may also be used to construct the inflatable curtain 14.

The perimeter 54 (FIG. 2) of the inflatable curtain 14 is defined at least partially by an upper edge 70, an opposite lower edge 72 of the curtain, and front and rear portions 74 and 76, respectively, of the inflatable curtain spaced apart horizontally along the upper and lower edges. The front and rear portions 74 and 76 of the inflatable curtain 14 include front and rear edges 80 and 82, respectively, that are spaced horizontally apart along the upper and lower edges 70 and 72 and extend between the upper and lower edges.

Figure 4:
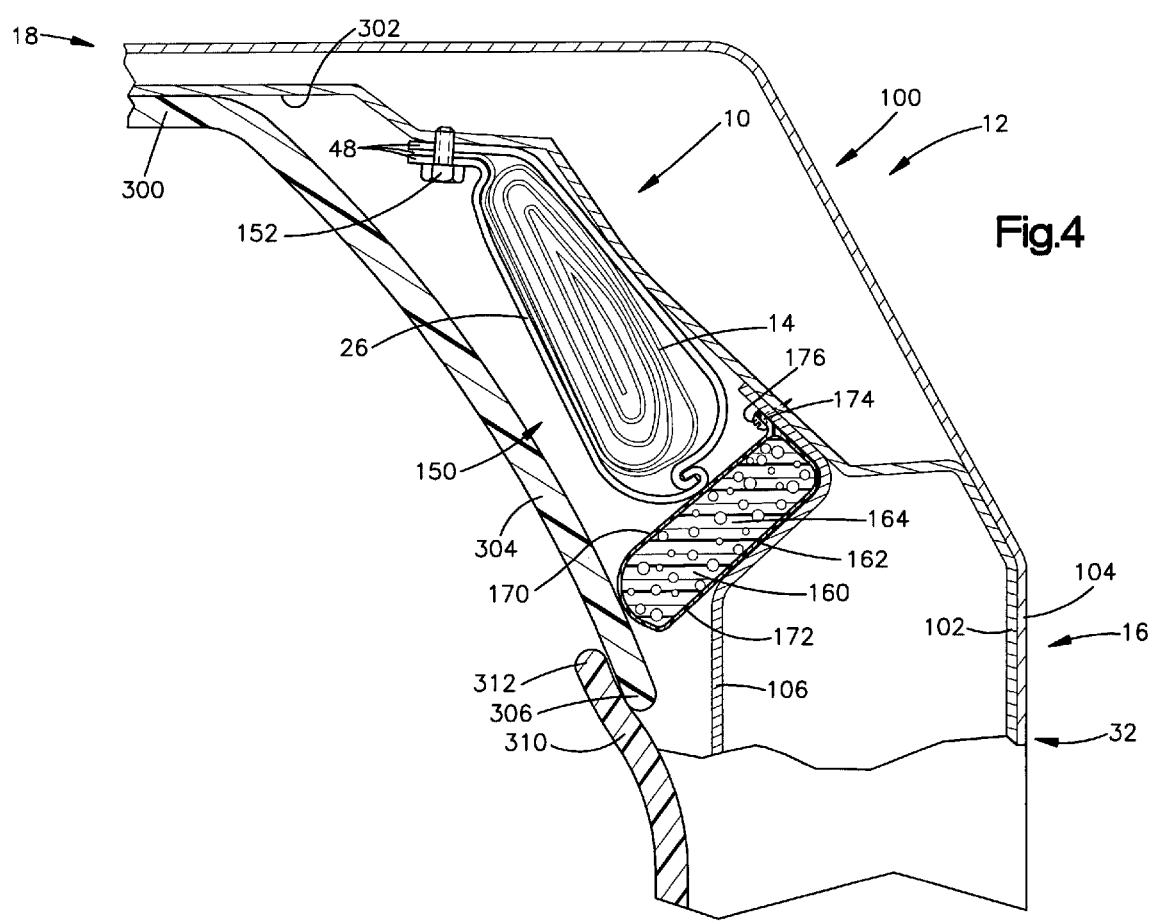
FIG. 4 is a sectional view taken generally along line 4-4 in FIG. 1.
Figure 5:
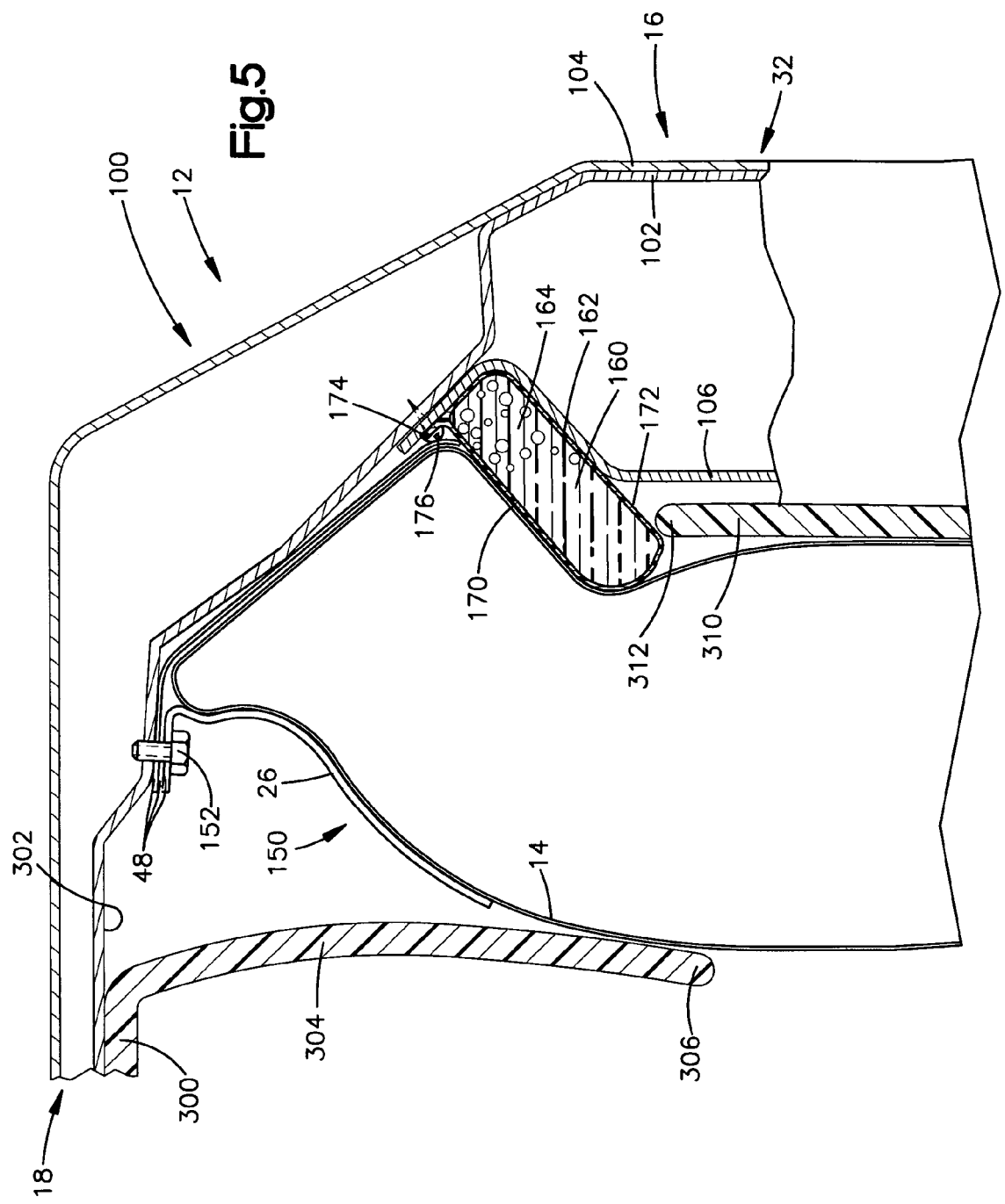
FIG. 5 is a sectional view taken generally along line 5-5 in FIG. 2.

As illustrated in FIGS. 3-5, a vehicle roof rail 100 is located at the intersection of the side structure 16 of the vehicle and the vehicle roof 18. The side structure 16, roof 18 and roof rail 100 are formed from pieces of sheet metal that are stamped or otherwise formed into predetermined shapes and welded or otherwise connected to form a desired structure. As best shown in FIGS. 4 and 5, inner and outer pieces of sheet metal 102 and 104, respectively, are used to form the side structure 16, roof 18 and roof rail 100. A third piece of sheet metal 106 helps to form the B pillar 32 of the vehicle 12. Those skilled in the art will appreciate that the side structure 16, roof 18, roof rail 100, and B pillar 32 may have alternative configurations and/or constructions.

In the illustrated embodiment, the inflatable curtain 14 and housing 26 are assembled as a module 150 that can be installed in the vehicle 12 as a unit. The module 150 is connected to the vehicle 12 by fastening means 152, such as bolts or screws. The vehicle 12 includes a headliner 300 that extends along an inner surface 302 of the roof 18 of the vehicle. The headliner 300 has a portion 304 that extends at an acute angle relative to the roof 18 adjacent the module 150. The portion 304 of the headliner 300 overlies the module 150 and conceals the module in the vehicle 12. In a non-deployed condition of the inflatable curtain 14, a terminal end 306 of the headliner 300 is in abutting engagement with a trim piece 310 (FIG. 4) that overlies the B pillar 32.

The apparatus 10 also includes a deployment ramp 160 positioned adjacent the roof rail 100 and the B pillar 32, as illustrated in FIGS. 1-6. As shown in FIGS. 1 and 2, the apparatus 10 may also include a similar or identical deployment ramp 160 positioned adjacent the roof rail 100 and the C pillar 34. The apparatus 10 may further include a similar or identical deployment ramp (not shown) positioned adjacent the roof rail 100 and the A pillar 30.

Figure 6:
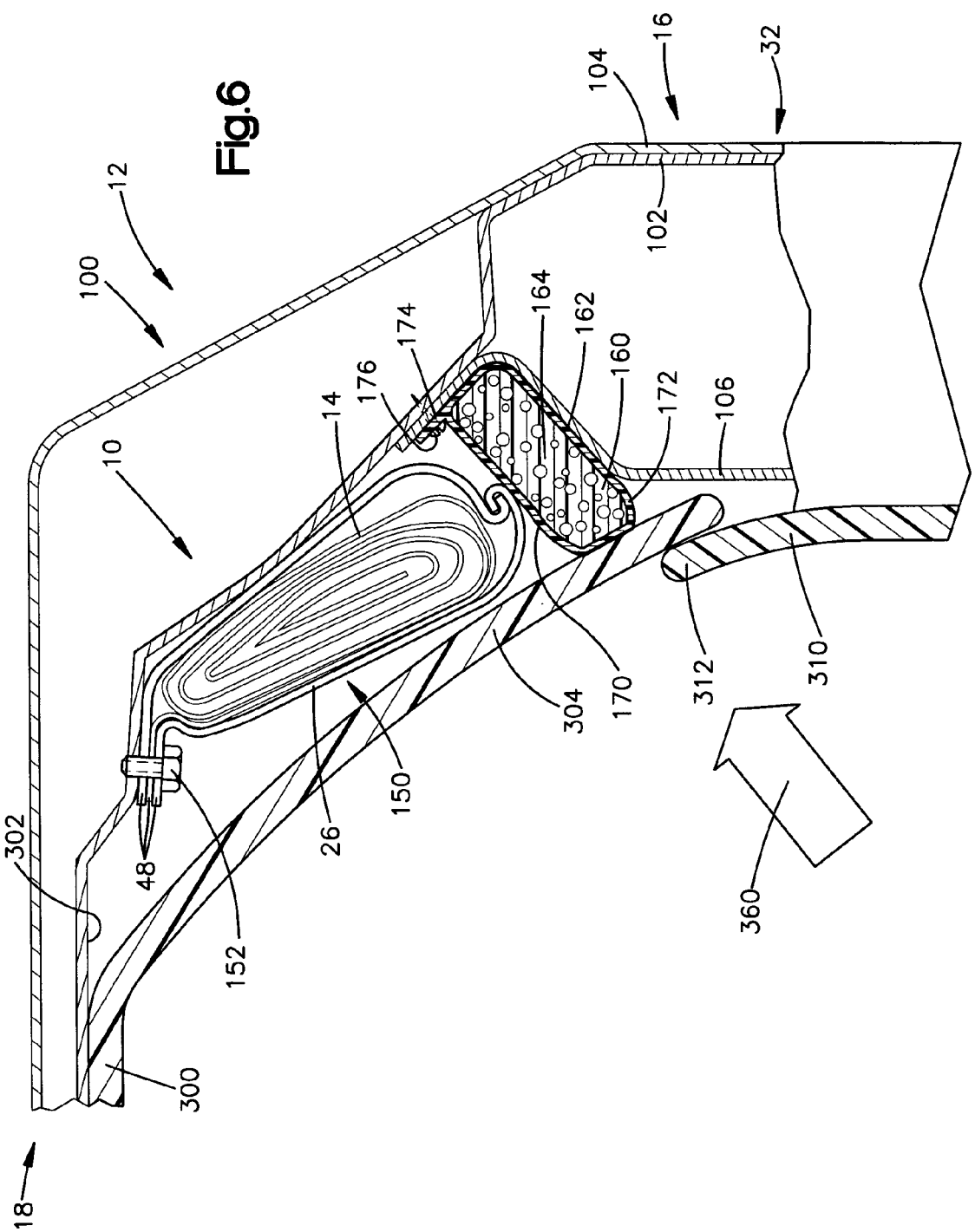
FIG. 6 is an enlarged view of a portion of the apparatus of FIG. 4 in a compressed condition.

According to the first embodiment, as best shown in FIGS. 4-6, the deployment ramp 160 is constructed of a structural foam material. In this construction, the deployment ramp may include an outer skin 162 surrounding a foam core 164. The foam core 164 may have a generally low density cellular foam polymer construction and the outer skin 162 may have a polymer construction of a higher density than the foam core. For example, the foam core 164 and outer skin 162 may be constructed of the same polymer, the core having a low density cellular configuration and the outer skin having a higher density cellular or solid configuration. Examples of polymer materials with which the outer skin 162 and foam core 164 may be constructed are acrylonitrile butadiene styrene (ABS), polyvinyl chloride (PVC), polyurethane, and polyethylene.

Cellular foam materials exhibit what are referred to as compression force deflection (CFD) properties. CFD properties are used to describe the return force associated with a cellular foam material. By "return force," it is meant to describe the propensity of the material to return to its original shape after deflection, i.e., the force with which the foam material pushes back against a compressive force. These CFD properties may describe a cellular foam material in terms of a compressive load (e.g., psi) placed on the foam material and a deflection (%) resulting from the load. The CFD properties also describes the return pressure (psi) that the foam material exerts for a given deflection (%). Typical cellular foam materials exhibit CFD properties in which the return force of the foam increases as a function of compressive loading on the foam.

For many cellular foam materials, the return force increases substantially as a function of compressive loading on the foam. As a result, as the foam material is loaded and the foam deflects, the return force increases rapidly and the foam resists further deflection until a point is reached at which the cells are compressed and the foam acts as a solid.

In a scenario in which such a cellular foam material is used as a cushion to absorb impacts with an object, a rapid increase in return force results in a more rapid deceleration of the object. It may, however, be desirable provide a more smooth or uniform deceleration of the object striking the foam material.

According to the present invention, the deployment ramp 160 may be constructed of a cellular foam polymer material that helps reduce or minimize the degree to which the return force of the foam increases while undergoing an increase in deflection. An example of a cellular foam polymer material that may be particularly suited for constructing the deployment ramp 160 is CONFOR® brand foam materials, which are available commercially from EAR Specialty Composites, a division of the Aearo Company of Indianapolis, Ind. CONFOR® foam materials are cellular foam polymer materials that exhibit more uniform return force over a wider range of deflection. As an example, CONFOR® brand CFNT cellular foam can exhibit less than a 0.3 psi increase in return force from 10-60% deflection.

The deployment ramp 160 is positioned near the location where the headliner 304 meets the trim piece 310. The deployment ramp 160 may have a variety of shapes or configurations designed to accommodate a particular construction of the vehicle 12 and/or module 150. As shown in FIGS. 4-6, the deployment ramp 160 has a ramp surface 170 presented facing toward the module 150, generally inboard in the vehicle 12 and away from the side structure 16. The deployment ramp 160 has a lower surface 172 that is configured to engage with the sheet metal construction of the side structure 16, particularly the third piece of sheet metal 106. The deployment ramp 160 may include a tab portion 174 through which fastening means 176, such as a screw, extends to connect the deployment ramp to the side structure 16.

When the module 150 is installed in the vehicle 12 as shown in FIGS. 4-6, the fastener 152 extends through the overlying tab portions 48 of the inflatable curtain 14 and cover 26 to secure the module 150 to the vehicle 12. When installed in the vehicle 12, the module 150 is positioned adjacent the roof rail 100 near the intersection of the side structure 16 and roof 18. When the module 150 is installed in the vehicle 12, the rolled-up inflatable curtain 14 and housing 26 extend along the roof rail 100 and are oriented generally downward at an angle from the vehicle roof 18 and toward the side structure 16, as viewed in FIGS. 4-6.

The module 150, when installed in the vehicle 12, extends along the roof rail 100 and along the intersection of the side structure 16 and the roof 18, as shown in FIGS. 1, 4 and 6. Those skilled in the art, however, will recognize that the configuration of the vehicle structure, and thus the spatial and interconnecting relationships between the vehicle structure (i.e., the side structure 16, roof 18, and roof rail 100) and the headliner 300, trim piece 310 and module 150, may vary depending upon the particular design of the vehicle 12. Therefore, it will be appreciated that the vehicle structure illustrated in FIGS. 1-6 and the spatial and interconnecting relationships between the vehicle structure and the headliner 300, trim piece 310, and module 150 is for illustrative purposes and may vary without departing from the spirit of the present invention.

The vehicle 12 includes a sensor mechanism 350 (shown schematically in FIGS. 1 and 2) for sensing the occurrence of an event for which inflation of the inflatable curtain 14 is desired, such as a side impact to the vehicle 12 and/or a vehicle rollover. Upon sensing the occurrence of such an event, the sensor mechanism 350 provides an electrical signal over lead wires 352 to the inflator 24. The electrical signal causes the inflator 24 to be actuated in a known manner. The inflator 24, when actuated, discharges fluid under pressure into the inflatable curtain 14.

The inflatable curtain 14 inflates under the pressure of the inflation fluid from the inflator 24. This causes the cover 26 to open, which permits the inflatable curtain 14 to deploy. The inflatable curtain 14 inflates away from the roof 18 in a downward direction as shown in the drawings and in a downward direction with respect to the direction of forward travel of the vehicle 12 into the position illustrated in FIGS. 2, 3, and 5.

The inflatable curtain 14, when inflated, extends along the side structure 16 of the vehicle 12 and is positioned between the side structure and any occupant of the vehicle. The inflatable curtain 14 covers portions of the vehicle side structure that extend between the A pillar 30 and the C pillar 34 of the vehicle 12 and may overlie portions of the A pillar, C pillar, and the B pillar 32 of the vehicle. The inflatable curtain 14, when inflated, may be positioned between the vehicle side structure 16 and the front and rear vehicle seating 44 and 46.

Those skilled in the art will appreciate that the extent and coverage of the inflatable curtain 14 in the vehicle 12 may vary. For example, the extent and coverage of the inflatable curtain 14 may vary depending on a variety of factors, such as the architecture of the vehicle 12, the position of the inflatable curtain 14 in the vehicle, and the desired extent or coverage of the inflatable curtain.

The inflatable curtain 14, when inflated, helps to protect a vehicle occupant in the event of a vehicle rollover or a side impact to the vehicle 12. The inflatable curtain 14 may cover an area of the side structure 16 extending from the A pillar 30 to the C pillar 34 and from the roof 18 down to adjacent or below lower edges of the side windows 40 and 42. The inflatable curtain 14, when inflated, helps to absorb the energy of impacts with the curtain and helps to distribute the impact energy over a large area of the curtain.

Referring to FIGS. 4 and 5, the deployment ramp 160 helps to deflect or otherwise direct the inflatable curtain 14 to deploy inboard of the trim piece 310, between the trim piece and occupants of the vehicle 12. The deployment ramp 160 directs the inflatable curtain 14 to inflate over the terminal end portion 312 of the trim piece 310. This allows the inflatable curtain 14, when inflated, to extend inboard of the trim piece 310 and overlie the trim piece. The deployment ramp 160 helps prevent the inflatable curtain 14 from getting caught on the trim piece 310 or inflating between the trim piece and the side structure 16.

According to the present invention, in addition to directing deployment of the inflatable curtain 14, the deployment ramp 160 is also constructed to help absorb or dissipate impact forces applied to the ramp. Such impact forces may occur, for example, when a vehicle occupant strikes the trim piece 310 while the inflatable curtain 14 is in the stored condition. This may result, for example, upon the occurrence of an event for which inflation of the inflatable curtain 14 is not desired. Such impact forces may also occur, for example, if a portion of a vehicle occupant strikes or impacts the deployment ramp 160 through a non-inflated portion of the inflatable curtain 14. The deployment ramp 160, having the cellular foam polymer material construction previously described, is compressible, which allows the ramp to deform in response to impacts with the ramp. As described above, the effectiveness of the deployment ramp 160 in absorbing these impact forces is affected by the CFD properties of the cellular foam used to construct the ramp. The deployment ramp 160, after compressing under an impact force, has the tendency to return to its original configuration and is thereby configured to facilitate deployment of the inflatable curtain 14 inboard of the trim piece 310.

FIG. 6 illustrates the deployment ramp 160 under compression. In FIG. 6, a force is applied to the deployment ramp 160 through the headliner 300 and trim piece 310. The force is indicated generally by the arrow identified at 360 in FIG. 6. In going from the non-compressed condition of FIG. 4 to the compressed condition of FIG. 6, the space or volume occupied by the deployment ramp 160 is reduced. Because the deployment ramp 160 compresses when absorbing impact forces, it requires only the volume of space it occupies in the non-compressed condition. This is advantageous because the deployment ramp 160 does not require any extra space into which to deflect when absorbing impact forces.

The deployment ramp 160 thus has a construction that is sufficient to direct the inflatable curtain 14 to inflate inboard of the trim piece 310 and that is sufficient to help absorb or dissipate forces of impacts with the ramp. Since the deployment ramp 160 returns to its normal configuration after compression, the ramp can retain its capacity to facilitate deployment of the inflatable curtain 14 after an impact occurs. Thus, the impact does not compromise the performance of the deployment ramp 160 in the occurrence of a subsequent event for which deployment of the inflatable curtain 14 is desired.

A second embodiment of the present invention is illustrated in FIGS. 7 and 8. The second embodiment of the invention is similar to the first embodiment of the invention illustrated in FIGS. 1-6. Accordingly, numerals similar to those of FIGS. 1-6 will be utilized in FIGS. 7 and 8 to identify similar components, the suffix letter "a" being associated with the numerals of FIGS. 7 and 8 to avoid confusion.

The deployment ramp 160a is illustrated schematically in FIGS. 7 and 8. Referring to FIGS. 7 and 8, the deployment ramp 160a is positioned near the location where the headliner 300a meets the trim piece 310a. The deployment ramp 160a includes a base 400, a slider 420 slidable relative to the base, and means 430, such as a spring, that biases the slider relative to the base. The base 400 includes a support portion 402 positioned against the side structure 16a and a flange portion 410 that extends transversely from the support portion. Fastening means 404, such as a screw, may extend through the support portion 402 to connect the deployment ramp 160a to the side structure 16a of the vehicle 12a.

The slider 420 includes a main portion 422 and an end portion 424 that extends transverse to the main portion. The main portion 422 cooperates with the flange portion 410 of the base 400 to allow the slider 420 to slide or otherwise move longitudinally relative to the flange portion. The spring 430 biases the slider 420 away from the base 400.

The deployment ramp 160a may have a variety of shapes or configurations designed to accommodate a particular construction of the vehicle 12a and/or module 150a. As shown in FIGS. 7 and 8, the deployment ramp 160a has a ramp surface 170a angled to face generally toward the module 150a, inboard in the vehicle 12a and away from the side structure 16a. The deployment ramp 160a is configured for being accommodated by the side structure 16a, and particularly the third piece of sheet metal 106a in the embodiment of FIGS. 7 and 8.

The deployment ramp 160a helps to deflect or otherwise direct the inflatable curtain 14a to deploy inboard of the trim piece 310a, between the trim piece and occupants of the vehicle 12a. The deployment ramp 160a directs the inflatable curtain 14a to inflate over the terminal end portion 312a of the trim piece 310a (e.g., as shown in FIGS. 3 and 5). This allows the inflatable curtain 14a, when inflated, to extend inboard of the trim piece 310a and overlie the trim piece. The deployment ramp 160a helps prevent the inflatable curtain 14a from getting caught on the trim piece 310a or inflating between the trim piece and the side structure 16a.

According to the present invention, in addition to directing deployment of the inflatable curtain 14a, the deployment ramp 160a is also constructed to help absorb or dissipate impact forces applied to the ramp. Such impact forces may occur, for example, when a vehicle occupant strikes the trim piece 310a while the inflatable curtain 14a is in the stored condition. Such impact forces may also occur, for example, if a portion of an occupant strikes the trim piece 310a through a non-inflated portion of the inflatable curtain 14a.

To help absorb or dissipate impact forces, the slider 420 is slidable or movable relative to the base 400 against the bias of the spring 430 in response to the impact forces. The deployment ramp 160a is thus compressed (FIG. 8) in response to the impact forces. Once the impact forces are absorbed or dissipated, the spring 430 biases the slider 420 back to the non-compressed condition of FIG. 7. In this condition, the deployment ramp 160a facilitates deployment of the inflatable curtain 14a inboard of the trim piece 310a as described above.

In the compressed condition of the deployment ramp 160a shown in FIG. 8, the slider 420 slides or otherwise moves relative to the base 400 against the bias of the spring 430. In going from the non-compressed condition of FIG. 7 to the compressed condition of FIG. 8, the space or volume occupied by the deployment ramp 160a is reduced. Because the deployment ramp 160a compresses when absorbing impact forces, it requires only the volume of space it occupies in the non-compressed condition. This is advantageous because the deployment ramp 160a does not require any extra space into which to deflect when absorbing impact forces.

The deployment ramp 160a thus has a construction that is sufficient to direct the inflatable curtain 14a to inflate inboard of the trim piece 310a and that is sufficient to help absorb or dissipate impact forces applied to the ramp. Since the deployment ramp 160a returns to its normal configuration after compression, the ramp can retain its capacity to facilitate deployment of the inflatable curtain 14a after an impact occurs. Thus, the impact does not compromise the performance of the deployment ramp 160a during a subsequent event for which deployment of the inflatable curtain 14a is desired.

A third embodiment of the present invention is illustrated in FIGS. 9 and 10. The third embodiment of the invention is similar to the first embodiment of the invention illustrated in FIGS. 1-6. Accordingly, numerals similar to those of FIGS. 1-6 will be utilized in FIGS. 9 and 10 to identify similar components, the suffix letter "b" being associated with the numerals of FIGS. 9 and 10 to avoid confusion.

The deployment ramp 160b is illustrated schematically in FIGS. 9 and 10. Referring to FIGS. 9 and 10, the deployment ramp 160b is positioned near the location where the headliner 300b meets the trim piece 310b. The deployment ramp 160b is constructed of a multi-layer sheet 450 that includes a metal layer 452 and a plastic layer 454 that overlie each other and are secured to each other by, for example, an adhesive. The metal layer 452 is constructed of a material, such as spring steel, that is flexible and resilient. The plastic layer 454 is flexible and conforms to the shape of the metal layer 452.

In the embodiment of FIGS. 9 and 10, the deployment ramp 160b includes a base portion 460 and a ramp portion 462 that projects from the base portion. Fastening means 464, such as a bolt or screw, may extend through the base portion 460 to connect the deployment ramp 160b to the side structure 16b of the vehicle 12b.

The ramp portion 462 includes a first portion 470 that extends from the base portion 460 and forms an acute angle with the base portion. The ramp portion 462 also includes a second portion 472 that extends from the first portion 470 and forms an acute angle with the first portion. The ramp portion 462 further includes a third portion 474 that extends from the second portion 472 and forms an acute angle with the second portion. The third portion 474 has a terminal end positioned adjacent the first portion 470, giving the ramp portion 462 a triangular configuration.

The deployment ramp 160b may have a variety of shapes or configurations designed to accommodate a particular construction of the vehicle 12b and/or module 150b. As shown in FIGS. 9 and 10, the deployment ramp 160b has a ramp surface 480 that is formed by the base portion 460 and the third portion 474 of the ramp portion 462. The ramp portion 462 is presented generally toward the module 150b, inboard in the vehicle 12b and away from the side structure 16b. The deployment ramp 160b is configured for being accommodated by the side structure 16b, and particularly the third piece of sheet metal 106b in the embodiment of FIGS. 9 and 10.

The deployment ramp 160b helps to deflect or otherwise direct the inflatable curtain 14b to deploy inboard of the trim piece 310b, between the trim piece and occupants of the vehicle 12b. The deployment ramp 160b directs the inflatable curtain 14b to inflate over the terminal end portion 312b of the trim piece 310b. This allows the inflatable curtain 14b, when inflated, to extend inboard of the trim piece 310b and overlie the trim piece. The deployment ramp 160b helps prevent the inflatable curtain 14b from getting caught on the trim piece 310b or inflating between the trim piece and the side structure 16b.

The deployment ramp 160b is constructed to help absorb or dissipate impact forces applied to the ramp. This is because the ramp portion 462 will deflect upon impacts with the deployment ramp 160*b*. Also, the resiliency of the metal layer 452 gives the ramp portion 462 the tendency to return to its original configuration after helping to dissipate the force associated with an impact. The plastic layer 452 may provide a softer impact surface for the deployment ramp 160*b*.

FIG. 10 illustrates the deployment ramp 160*b* under compression. In this condition, the first portion 470 of the ramp portion 462 may deflect at a location adjacent a bend 478 in the sheet metal 106*b* adjacent the upper end of a vehicle pillar. The ramp portion 462 may also deflect at or near the intersection of the first portion 470 and the second portion 472, and may also deflect at or near the intersection of the second portion and the third portion 474.

In going from the non-compressed condition of FIG. 9 to the compressed condition of FIG. 10, the space or volume occupied by the deployment ramp 160*b* is reduced. Because the deployment ramp 160*b* compresses when absorbing impact forces, the vehicle space it occupies is minimized. This may be advantageous because the deployment ramp 160*b* does not require any extra space into which to deflect when absorbing impact forces.

The deployment ramp 160*b* thus has a construction that is sufficient to direct the inflatable curtain 14*b* to inflate inboard of the trim piece 310*b* and that is sufficient to help absorb or dissipate impact forces applied to the ramp. Since the deployment ramp 160*b* returns to its normal configuration after compression, the ramp can retain its capacity to facilitate deployment of the inflatable curtain 14*b* after an impact occurs. Thus, the impact does not compromise the performance of the deployment ramp 160*b* during a subsequent event for which deployment of the inflatable curtain 14*b* is desired.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect an occupant of a vehicle that has a roof, a side structure, and a trim piece overlying the side structure, said apparatus comprising:
   an inflatable curtain that is inflatable away from the vehicle roof to a position adjacent the side structure of the vehicle; and
   a deployment ramp having a deployment position in which said deployment ramp directs said inflatable curtain to deploy inboard of the trim piece, said deployment ramp being configured and arranged to deflect away from said deployment position in order to absorb forces from occupant impacts with said deployment ramp, at least a portion of said deployment ramp being constructed of cellular foam material.
   said deployment ramp being further configured to absorb forces from impacts by undergoing compression when said deployment ramp deflects away from said deployment position.

2. The apparatus recited in claim 1, wherein said deployment ramp is configured and arranged to deflect in order to absorb forces from occupant impacts while said inflatable curtain is in a deflated and stored condition.

3. The apparatus recited in claim 2, wherein said deployment ramp is configured and arranged to return to said deployment position after absorbing forces from occupant impacts with said deployment ramp while said inflatable curtain is in the deflated and stored condition.

4. The apparatus recited in claim 1, wherein said deployment ramp returns to said deployment position as a result of the resilience of at least a portion of said deployment ramp.

5. The apparatus recited in claim 1, wherein said deployment ramp occupies a volume of space when in said deployment position, said volume of space occupied by said deployment ramp being reduced when said deployment ramp deflects away from said deployment position to absorb forces from impacts with said deployment ramp.

6. The apparatus recited in claim 1, wherein said cellular foam material undergoes compression when said deployment ramp deflects, said cellular foam material being resilient so as to cause said deployment ramp to return to said deployment position after undergoing compression.

7. The apparatus recited in claim 1, wherein said deployment ramp comprises an outer skin surrounding said cellular foam material.

8. The apparatus recited in claim 7, wherein said cellular foam material is made of a foamed polymer, said outer skin comprising a non-foamed layer of said polymer having a density greater than the density of said foamed polymer.

9. The apparatus recited in claim 1, wherein the side structure of the vehicle includes a pillar, the trim piece overlying the pillar, said deployment ramp while in said deployment position directing said inflatable curtain to deploy inboard of the trim piece overlying the pillar.

10. An apparatus for helping to protect an occupant of a vehicle that has a roof, a side structure, and a trim piece overlying the side structure, said apparatus comprising:
    an inflatable curtain that is inflatable away from the vehicle roof to a position adjacent the side structure of the vehicle; and
    a deployment ramp constructed of cellular foam material, said deployment ramp having a deployment position in which said deployment ramp directs said inflatable curtain to deploy inboard of the trim piece, said deployment ramp being configured and arranged to deflect away from said deployment position in order to absorb forces from occupant impacts with said deployment ramp.

11. An apparatus for helping to protect an occupant of a vehicle that has a roof, a side structure, and a trim piece overlying the side structure, said apparatus comprising:
    an inflatable curtain that is inflatable away from the vehicle roof to a position adjacent the side structure of the vehicle; and
    a deployment ramp constructed of cellular foam material, said deployment ramp having a deployment position in which said deployment ramp directs said inflatable curtain to deploy inboard of the trim piece, said deployment ramp being configured and arranged to deflect away from said deployment position in order to absorb forces from occupant impacts with said deployment ramp,
    said deployment ramp being further configured to absorb forces from impacts by undergoing compression when said deployment ramp deflects away from said deployment position.

* * * * *